US006665768B1

(12) United States Patent
Redford

(10) Patent No.: US 6,665,768 B1
(45) Date of Patent: Dec. 16, 2003

(54) TABLE LOOK-UP OPERATION FOR SIMD PROCESSORS WITH INTERLEAVED MEMORY SYSTEMS

(75) Inventor: John L. Redford, Cambridge, MA (US)

(73) Assignee: ChipWrights Design, Inc., Newton, MA (US)

( * ) Notice: Subject to any disclaimer, the term of this patent is extended or adjusted under 35 U.S.C. 154(b) by 215 days.

(21) Appl. No.: 09/689,099

(22) Filed: Oct. 12, 2000

(51) Int. Cl.$^7$ .............................................. G06F 12/00
(52) U.S. Cl. .......................... 711/5; 711/154; 711/157; 711/150; 711/147; 711/219; 711/221; 365/230.03; 365/230.04; 365/230.05
(58) Field of Search ................................. 711/221, 211, 711/219, 157, 154, 5, 153, 147, 150; 365/230.03–230.04; 345/540, 564

(56) References Cited

U.S. PATENT DOCUMENTS

| | | | |
|---|---|---|---|
| 4,604,695 A | | 8/1986 | Widen et al. ................ 364/200 |
| 4,679,140 A | | 7/1987 | Gotou et al. ................ 364/200 |
| 5,111,389 A | * | 5/1992 | McAuliffe et al. .......... 711/203 |
| 5,479,624 A | * | 12/1995 | Lee ................................ 711/1 |
| 5,497,478 A | * | 3/1996 | Murata ........................ 711/157 |
| 5,638,533 A | * | 6/1997 | Law ............................. 345/567 |
| 5,684,973 A | * | 11/1997 | Sullivan et al. ................ 711/5 |
| 5,737,572 A | * | 4/1998 | Nunziata ..................... 711/157 |
| 5,872,987 A | * | 2/1999 | Wade et al. |
| 5,924,111 A | * | 7/1999 | Huang et al. .................. 711/5 |
| 5,924,117 A | * | 7/1999 | Luick .................... 365/230.03 |
| 5,991,857 A | * | 11/1999 | Koetje et al. ................ 711/154 |
| 6,076,136 A | * | 6/2000 | Burroughs et al. ............. 711/5 |
| 6,381,668 B1 | * | 4/2002 | Lunteren ....................... 711/5 |
| 6,452,864 B1 | * | 9/2002 | Condemi et al. ........... 365/233 |
| 6,473,339 B2 | * | 10/2002 | De Ambroggi et al. ..... 711/157 |

OTHER PUBLICATIONS

Hennessey, et al., "Enhancing Vector Performance," Computer Architecture a Quantitative Approach, Second Edition, Section B5, pp.B23–B29, 1996.

* cited by examiner

*Primary Examiner*—Matthew Kim
*Assistant Examiner*—Zhuo H. Li
(74) *Attorney, Agent, or Firm*—MIlls & Onello, LLP

(57) ABSTRACT

An apparatus and method for accessing data in a processing system are described. The system includes multiple processing elements for executing program instructions. The processing system can be a single instruction stream, multiple data stream (SIMD) system, and the processing elements can be the multiple data paths of the SIMD system. Each processing element or data path is associated with an identifying value which distinguishes it from the other elements. A memory, which can be configured as an interleaved memory including multiple memory banks, stores data accessed by the processing elements. The data can be a table used for table look-ups for such functions as mathematical operations. Also, multiple copies of the table can be stored in multiple respective banks of the memory. An instruction calling for a memory access such as a table look-up is received. The instruction contains address information which can be a starting address of a table in memory. Each processing element generates an address for performing the memory access by combining at least a portion of its identifying value with the address information in the instruction. The generated address is then used to perform the access. Because the address used for the access depends on the processing element performing the access, the number of simultaneous accesses to a single memory address can be controlled and predicted.

24 Claims, 3 Drawing Sheets

TABLE LOOK-UP OPERATION FOR SIMD PROCESSORS WITH INTERLEAVED MEMORY SYSTEMS

BACKGROUND OF THE INVENTION

One approach to implementing a high-performance memory system is to use interleaved banks in the memory. Such a memory is built out of smaller memories referred to as banks, each of which handles part of the data being processed by the system. The addresses of locations in each bank are not sequential within a bank, but, rather, are sequential across the multiple banks. That is, for example, if the memory has four banks, then bank 0 could handle location addresses 0, 4, 8, . . . , in sequence; bank 1 could handle addresses 1, 5, 9, . . . ; bank 2 could handle addresses 2, 6, 10, . . . ; and bank 3 could handle addresses 3, 7, 11, . . . Hence, if instructions that are being executed access the memory addresses in sequence, as is often the case, the instructions can access different banks of the memory and can, therefore, be executed simultaneously.

In many cases, the addresses of accessed data are independent. For example, this is the case when a table look-up for the result of some function such as a complex mathematical function is being performed. In this case, the address is dependent upon the input data and may have no correlation to other addresses, e.g., the addresses are not in sequence. If the addresses are applied to an interleaved memory at once, they may spread across all the banks, or they may all hit on one bank. This situation results in reduced performance because of the simultaneous accesses. It also makes the time to process a table look-up indeterminate. This makes it difficult for the system to meet real-time performance time constraints.

One prior approach to dealing with these problems is for each processor to have an individual small private memory for holding tables. In this approach, because there is only one unit accessing the memory, it always takes the same time to handle table look-ups. However, this approach can be inefficient because, in general, the private memories are either too small or too big. They are too small if programmers want to store more tables than will fit, and they are too big if tables are not being used. In either case, the use of these individual memories can be inefficient.

SUMMARY OF THE INVENTION

The present invention is directed to an apparatus and method for accessing data in a processing system. A plurality of processing elements are provided for executing program instructions. Each processing element is associated with an identifying value. A memory stores data accessed by the processing elements while executing instructions. An instruction is received for execution. The instruction requires access to the memory and includes information associated with an address in the memory. For example, the information can be an address word containing the base or start address of a table stored in the memory. Each of the processing elements executing the instruction generates an address for accessing the memory by combining at least a portion of the information associated with an address in the memory with at least a portion of the identifying value associated with the processing element. The processing element then accesses the memory using the generated address.

In one embodiment, the memory is partitioned into a plurality of banks and can be interleaved. The instruction can require a look-up of data stored in a table. The table can be stored at a plurality of locations of the memory. Multiple copies of the table can be stored in respective multiple banks of the memory. Accordingly, multiple accesses to the same data item can be made to the multiple banks simultaneously by multiple processing elements.

In one embodiment, the processing system is a single instruction stream, multiple data stream (SIMD) processing system. Accordingly, instructions can be executed along multiple data paths simultaneously by the system. In this embodiment, each processing element is a data path in the SIMD system.

The address used by the processing element, i.e., data path, to access the memory is generated from the information associated with an address, e.g., the start address of the table, and the identifying value associated with the processing element. The identifying value uniquely identifies the processing element and therefore distinguishes it from the other processing elements. Therefore, adding it to the address used to access the memory ensures that the number of processing elements accessing the relevant memory address at one time can be controlled. In one embodiment, the identifying value is a multi-bit word. Only a predetermined number of the least significant bits of the word are added to the generated address and, therefore, control the number of processing elements that can access the memory location at a time. In one embodiment, the number of banks containing copies of the table being accessed is used to determine the number of bits. Specifically, in one embodiment, the number n of bits used to generate the memory address is defined by $N=2^n$, where N is the number of banks and/or the number of copies of the table stored in the banks. Therefore, the number of bits used in the address is the number of bits required to uniquely select one of the banks.

For example, if there are four copies of the table in the banks and four processing elements (data paths), two bits of the data path identifying word are used. The two bits are used to select one of the four banks and/or table copies for each of the four data paths. As a result, a one-to-one correspondence between the data paths and the table copies in the banks is developed, such that no simultaneous accesses by multiple processing elements to the same memory location can occur. As another example, if there are four banks (table copies) and eight data paths, the two least significant bits of the identifying value are used. As a result, four pairs of data paths will access each bank (table copy). Hence, only two simultaneous accesses can occur at each memory location. The accesses will be delayed slightly, but much less than they would be delayed in an uncontrolled setting where all eight data paths could make eight simultaneous accesses to the same location.

The approach of the invention provides numerous advantages over approaches of the prior art. For example, the invention spreads table look-up memory accesses over multiple memory banks in an interleaved memory in a controlled and predictable fashion. As a result, the number of simultaneous accesses can be limited. In addition to limiting simultaneous accesses, even where simultaneous accesses do occur, the maximum possible number of them is limited and known. Therefore, the time required for memory accesses is predictable, thus facilitating meeting real-time scheduling constraints.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
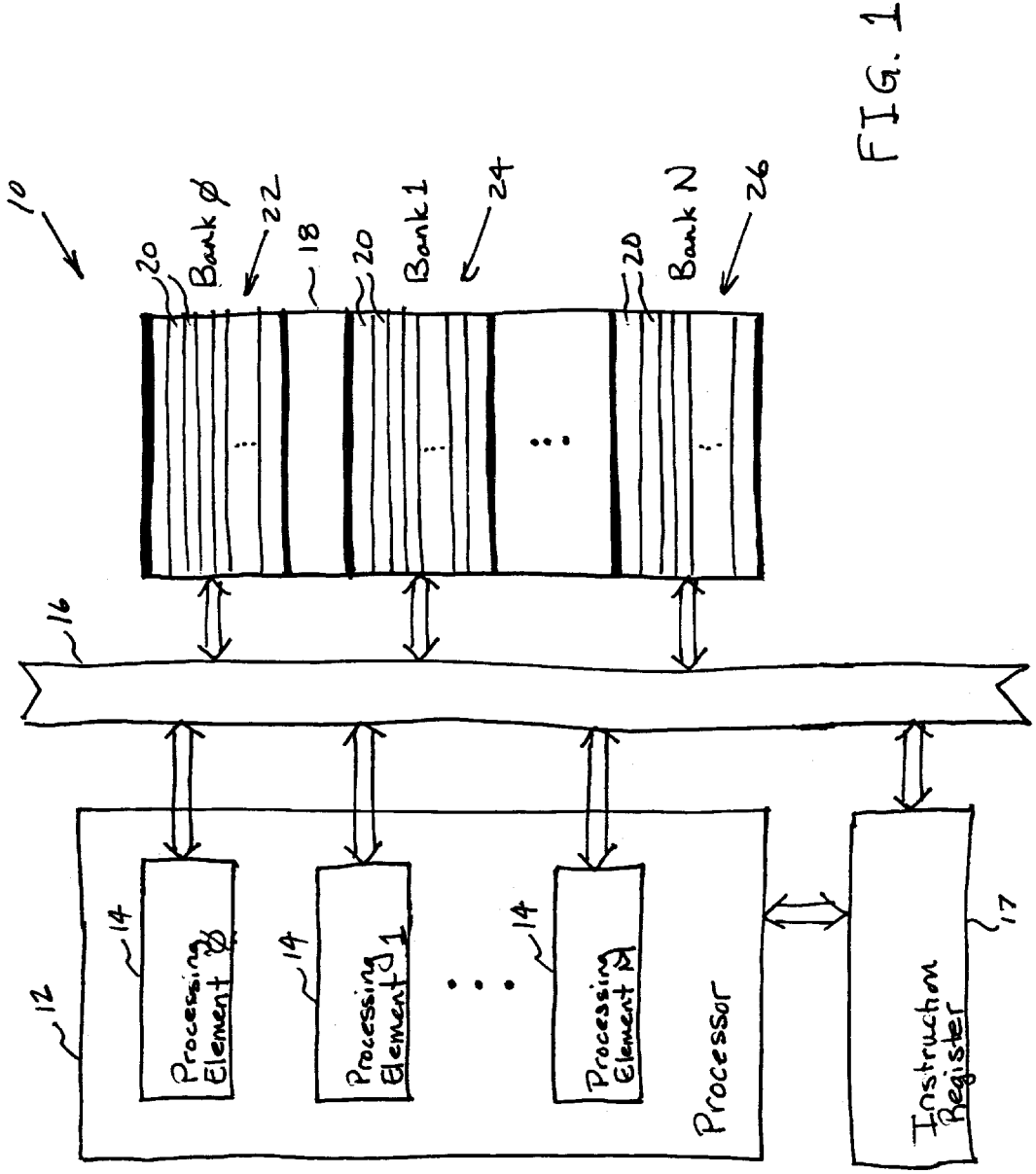
FIG. 1 contains a schematic block diagram illustrating one embodiment of a processing system in accordance with the invention.

FIG. 1 contains a schematic block diagram illustrating one embodiment of a processing system 10 in accordance with the invention. The system 10 includes a processor 12 which includes multiple processing elements 14. In one embodiment, the processor 12 is a SIMD processor and the processing elements 14 represent the multiple data paths of the SIMD processor. The processor 12 operates to execute instructions received from an instruction register 17 directly or via a system bus 16. Because the illustrated system is preferably a SIMD system, multiple processing elements 14 can be used to execute one or more instructions simultaneously.

The system 10 also includes a main memory 18 which interfaces with the rest of the system 10 via the bus 16. Instructions executed by the processor 12 can read data stored in the memory 18 and write data to the memory 18. For example, the memory 18 can store one or more tables which hold data such as results of mathematical operations for a number of input data values. Instructions being executed by the processor 12 can perform table look-ups to the memory to retrieve results of the operation from the table.

In accordance with the invention, the memory 10 is configured as having multiple banks, referred to as Bank0 (22), Bank1 (24), . . . , BankN (26). Each bank includes multiple locations 20 which in this embodiment are addressed in an interleaved fashion. That is, the addresses of adjacent locations 20 within a bank are not sequential, rather, the addresses are sequential across the multiple banks. That is, a first address, 0, for example, is used to access the first location of Bank0. The next address in the sequence, address 1, is used to access the first address in Bank1. In general, if there are N banks, then Bank i handles the addresses, where i=address mod N. If N is a power of 2, i.e., $N=2^n$, then the address modulo N is the bottom n bits of the address.

If N memory accesses are to be performed at once in such a system, they can all be done so long as the addresses all access different banks. For example, if it is desired to read every fifth element of an array starting at address A in a four-bank system, the addresses would be A, 5+A, 10+A, and 15+A. When applied to the banks, the low bits are Amod4, (5+A)mod4=1+Amod4, (10+A)mod4=2+Amod4, (15+A)mod4=3+Amod4. However, if the spacing between elements was four, then all the addresses would have the same low two bits, and all would access the same bank. For "strided" accesses like these, the interleaved bank scheme works best when the number of banks, N, and the stride S are relatively prime, that is, their greatest common divisor is 1. Thus, the performance of such as interleaved system depends on the relationship between the stride and the number of banks.

In the SIMD processor 12, in executing a table look-up, each data path 14 in the processor 12 will be providing its own address to the memory 18. In accordance with the invention, multiple copies of a table can be accessed if the address from each data path is distinguished by at least a portion of the data path ID number inserted in the least significant bits (LSBs) of the address. Therefore, in accordance with the invention, multiple copies of a table to be used for table look-ups can be stored in multiple respective banks of the memory. Since the data path ID numbers are all different, including a portion of the data path ID in the address will make the addresses access different copies of the table in different banks.

In one embodiment of the invention, when the processor 12 receives an instruction which includes a memory access, e.g., a table look-up, the instruction generally includes a starting address S which identifies a table base address in memory at which the table to be accessed begins. In response, the processor generates a Read Table instruction (RDT) or a Write Table instruction (WRT) for each processing element that is to perform the memory access, depending on whether a read of write is to be performed. The memory address to be used for the RDT or WRT instruction is generated by adding the base address S to an offset address P defined by the location of the data to be looked up or the location at which data is to be written. The resulting sum is then shifted left a number of bits n, defined by $N=2^n$, where N is the number of banks or table copies, to open the n least significant bits of the address. Next, the n LSBs of the data path ID for the data path that is to process the particular access are inserted into the open LSB places in the modified address. The resulting address, with the inserted data path ID bits, is then used by the data path to perform the access.

The formats for the Read Table (RDT) and Write Table (WRT) instructions, in accordance with one embodiment, are as follows:

$$RDT((S+P)<<n\ bits+DP_{13}\ ID\#[n\ bits])$$

$$WRT((S+P)<<n\ bits+DP_{13}\ ID\#[n\ bits])$$

In either instruction, the offset P is added to the base address S. That result is shifted, indicated by <<, to the left n bits, defined by $N=2^n$, where N the number of table copies. Next, the n LSBs of the data path ID number (DP_ID#) are inserted into the open LSB spaces in the address.

Because the addresses used for the accesses are correlated to the data paths making the accesses, the number of simultaneous accesses to one memory location can be controlled and predicted. For example, where there are N data paths and N copies of the table, there exists a one-to-one correspondence between table copies and data paths. As a result, no simultaneous accesses will occur.

Figure 2:
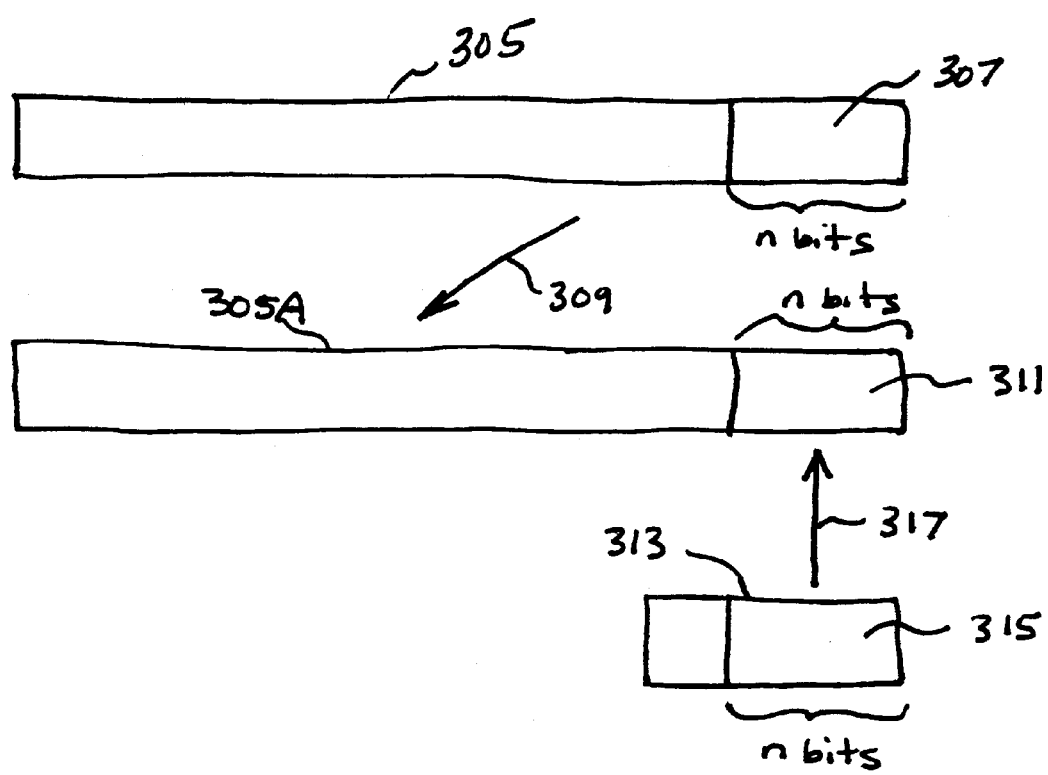
FIG. 2 contains a schematic diagram illustrating shifting of address bits and insertion of data path identifying bits in accordance with one embodiment of the present invention.

FIG. 2 contains a schematic diagram which illustrates the shifting of the address word and insertion of the data path ID bits, in accordance with one embodiment of the invention. Specifically, the sum address, i.e., the sum of the base address S and the offset P, is shown as 305. The sum address 305 includes a portion 307 defined by the n bits in the n LSB positions of the word 305. The arrow 309 schematically represents the shifting of the word 305 by n bits to the left, which leaves the n-bit LSB portion 311 of the shifted word 305A undefined. In one embodiment, the n LSBs remaining after the shift can be zeroes. After the shift, a portion 315 of a data path ID word 313 is inserted into the LSB portion 311 of the shifted word 305A. Specifically, in accordance with one embodiment, as indicated by the arrow 317, the n-bit portion 315 of the data path ID word 313 is inserted into the n-bit LSB portion 311 of the shifted word 305A.

In an alternative embodiment, the data path identifying portion of the address can be inserted using a different approach. For example, in one alternative embodiment, each of the base address S and offset address P can be shifted individually and then added together. Then, the data path ID bits can be inserted such as by adding them to the resulting sum. This latter approach can be performed in software, while the former approach can be performed in hardware.

Figure 3:
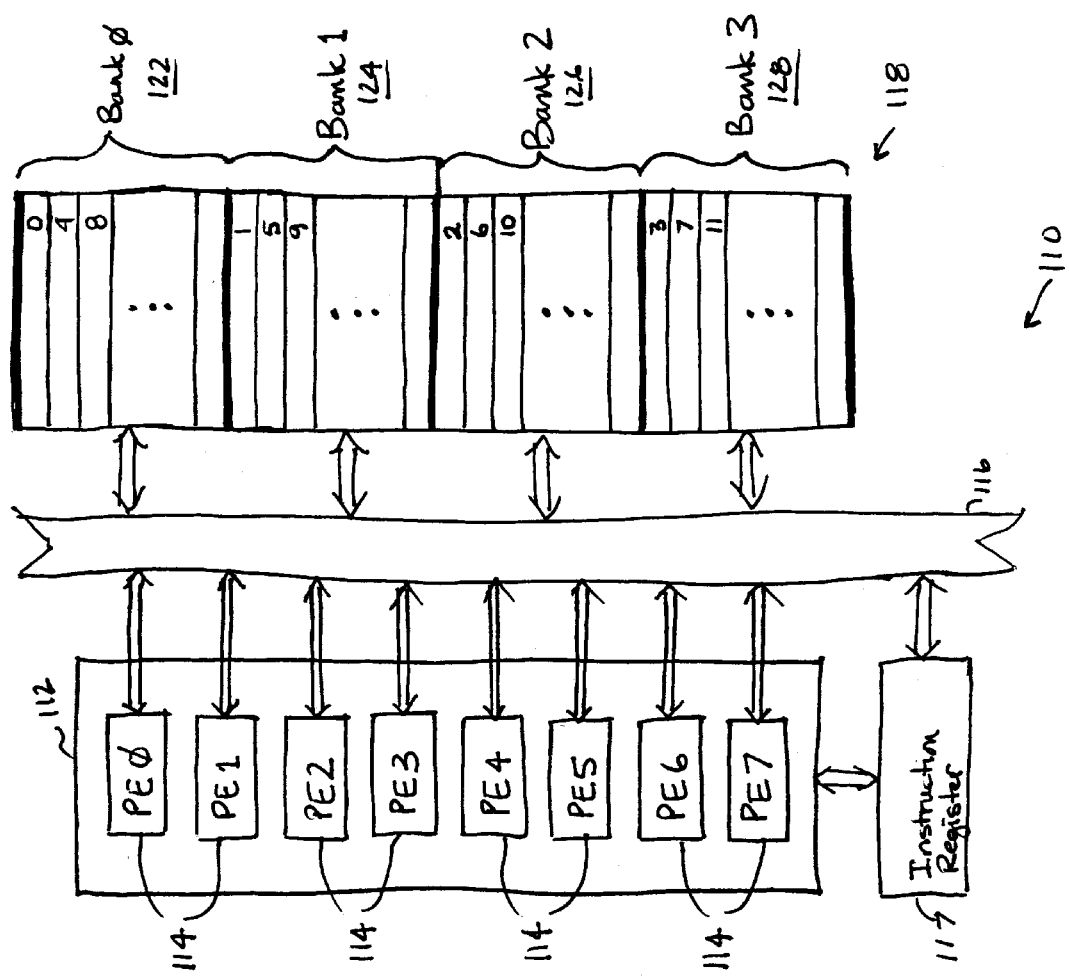
FIG. 3 contains a schematic block diagram of an example system configuration according to an embodiment of the present invention.

FIG. 3 contains a schematic block diagram of another example system configuration according to an embodiment of the present invention. In this configuration, the number of table copies is not the same as the number of data paths or processing elements. In the embodiment of FIG. 3, the processor 112 includes eight processing elements 114, labeled PE0 through PE7. The memory includes four banks 122, 124, 126 and 128, labeled Bank0, Bank1, Bank2 and Bank3, respectively. For purposes of this illustration, it is assumed that each bank contains a copy of a table being used for a look-up. It will be understood that the number of banks and the number of table copies need not be the same. In the case where they are not the same, N is the number of table copies and the number n of bits used to generate the address for a table access is based on the number of table copies N.

In the embodiment of FIG. 3, the banks are interleaved such that bank 0 includes location addresses 0, 4, 8, . . . ; bank 1 includes addresses 1, 5, 9, . . . ; bank 2 includes addresses 2, 6, 1 0, . . . ; and bank 3 includes addresses 3, 7, 11, . . . ; and so on. Because there are four copies of the table, the number n of bits used to identify the data path for a memory access instruction is two. This uniquely identifies the table copies. However, since there are eight data paths 114, the two bits cannot uniquely identify the data paths 114. Instead, the two bits identify four pairs of data paths 114. Each pair of data paths 114 can then access the same table copy simultaneously. While this may not be as efficient as a perfect one-to-one correspondence which eliminate simultaneous accesses altogether, it is a great improvement over randomly accessing the tables for at least two reasons. First, with a conventional random access, it is possible that all eight data paths would attempt to access the same location simultaneously, causing substantial delay. Second, in addition to the delay, this possibility makes the timing of such memory accesses unpredictable, resulting in difficulty in meeting system time constraints.

The embodiment of FIG. 3 illustrates the system flexibility afforded by the approach of the invention. As shown in FIG. 3, it may not be necessary to have a perfect one-to-one correspondence between data paths and table copies. The designer enjoys the flexibility of trading off memory space and cost constraints versus system performance capabilities. For example, where a table is very large, it may be most efficient to have only a single copy of the table stored in a single bank of the memory. In this case, it may be decided by the designer that multiple simultaneous accesses to the table will be tolerated in the interest of saving memory space. Where the table is relatively small, it may be decided that each bank can have a copy of the table to reduce or eliminate simultaneous accesses. Hence, the designer can perform the memory space/access time trade-off by selecting the number of table copies.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A method of accessing data in a processing system comprising:

providing a plurality of processing elements for executing program instructions, each processing element being associated with an identifying value which identifies the processing element;

providing a memory for storing data accessed by the processing elements while executing instructions, the memory being partitioned into a plurality of interleaved banks such that memory locations having successive addresses are in different banks of the memory;

receiving instructions for execution, the instructions requiring access to the memory and including information associated with an address in the memory; and for each of the plurality of processing elements executing the instructions, generating an address for accessing the memory, said generating comprising combining at least a portion of the information associated with an address in the memory with at least a portion of the identifying value associated with the processing element, wherein generating the address comprises generating a data word representing the information associated with the address in memory by adding information provided by the instruction identifying the address in memory in which the data to be accessed begins to an offset address defining the location of data to be accessed for the processing element; and with each of the plurality of processing elements executing the instruction, using the generated address to access the memory.

2. The method of claim 1 wherein generating the address comprises:

shifting the data word representing the information associated with the address in memory by a number n of bits, where $N=2^n$ and N is the number of banks; and inserting n least significant bits of the identifying value into the shifted data word.

3. The method of claim 1 wherein the instruction calls for a look-up of a data item in a table stored at a plurality of locations in a bank of the memory.

4. The method of claim 1 wherein one or more of the plurality of banks has at least one copy of a table of the data.

5. The method of claim 4 wherein generating the address comprises:

shifting the data word representing the information associated with the address in memory by a number n of bits, where $N=2^n$ and N is the number of copies of the table of data; and inserting n least significant bits of the identifying value into the shifted data word.

6. The method of claim 5 wherein the instruction calls for a look-up of a data item in the tables stored in the banks.

7. The method of claim 1 wherein the instruction calls for a look-up of a data item in a table stored at a plurality of locations in a bank of the memory.

8. The method of claim 4 wherein one or more of the plurality of banks has at least one copy of the table of data.

9. The method of claim 1 wherein the instruction calls for a look-up of a data item in a table stored at a plurality of memory locations.

10. The method of claim 1 wherein the memory has at least one table of data stored at a plurality of memory locations.

11. The method of claim 1 wherein the processing system is a single instruction stream, multiple data stream (SIMD) processing system.

12. The method of claim 11 wherein each processing element is a data path in the SIMD processing system.

13. An apparatus for accessing data in a processing system comprising:

a memory partitioned into a plurality of interleaved banks such that memory locations having successive addresses are in different banks of the memory; and a plurality of processing elements for executing program instructions, each processing element being associated with an identifying value which identifies the processing element, wherein, in executing instructions requiring access to the memory and including information associated with an address in the memory, each processing element (i) receives an instruction for execution, (ii) generates an address for accessing the memory by combining at least a portion of the information associated with an address in the memory with at least a portion of the identifying value associated with the processing element, and (iii) accesses the memory using the generated address;

wherein generating the address comprises generating a data word representing the information associated with the address in memory by adding information provided by the instruction identifying the address in memory in which the data to be accessed begins to an offset address defining the location of data to be accessed for the processing element.

14. The apparatus of claim 13 wherein, in generating the address, the processing element (i) shifts the data word representing the information associated with the address in memory by a number n of bits, where $N=2^n$ and N is the number of banks, and (ii) inserts n least significant bits of the identifying value into the shifted data word.

15. The apparatus of claim 13 wherein the instruction calls for a look-up of a data item in a table stored at a plurality of locations in a bank of the memory.

16. The apparatus of claim 13 wherein one or more of the plurality of banks has at least one copy of a table of the data.

17. The apparatus of claim 16 wherein, in generating the address, the processing element (i) shifts the data word representing the information associated with the address in memory by a number n of bits, where $N=2^n$ and N is the number of copies of the table of data, and (ii) inserts n least significant bits of the identifying value into the shifted data word.

18. The apparatus of claim 16 wherein the instruction calls for a look-up of a data item in the tables stored in the banks.

19. The apparatus of claim 13 wherein the instruction calls for a look-up of a data item in a table stored at a plurality of locations in a bank of the memory.

20. The apparatus of claim 19 wherein one or more of the plurality of banks has at least one copy of the table of data.

21. The apparatus of claim 13 wherein the instruction calls for a look-up of a data item in a table stored at a plurality of memory locations.

22. The apparatus of claim 13 wherein the memory has at least one table of data stored at a plurality of memory locations.

23. The apparatus of claim 13 wherein the processing system is a single instruction stream, multiple data stream (SIMD) processing system.

24. The apparatus of claim 23 wherein each processing element is a data path in the SIMD processing system.

* * * * *

UNITED STATES PATENT AND TRADEMARK OFFICE
CERTIFICATE OF CORRECTION

PATENT NO.   : 6,665,768 B1
DATED        : December 16, 2003
INVENTOR(S)  : John L. Redford It is certified that error appears in the above-identified patent and that said Letters Patent is hereby corrected as shown below:

Column 6,
Line 55, delete "claim 5" and insert -- claim 4 --.
Line 60, delete "claim 4" and insert -- claim 7 --.

Signed and Sealed this

Fourth Day of May, 2004

JON W. DUDAS
*Acting Director of the United States Patent and Trademark Office*